No. 837,530. PATENTED DEC. 4, 1906.
L. B. WYGANT.
KNOTTER.
APPLICATION FILED MAY 19, 1905.
9 SHEETS—SHEET 1.
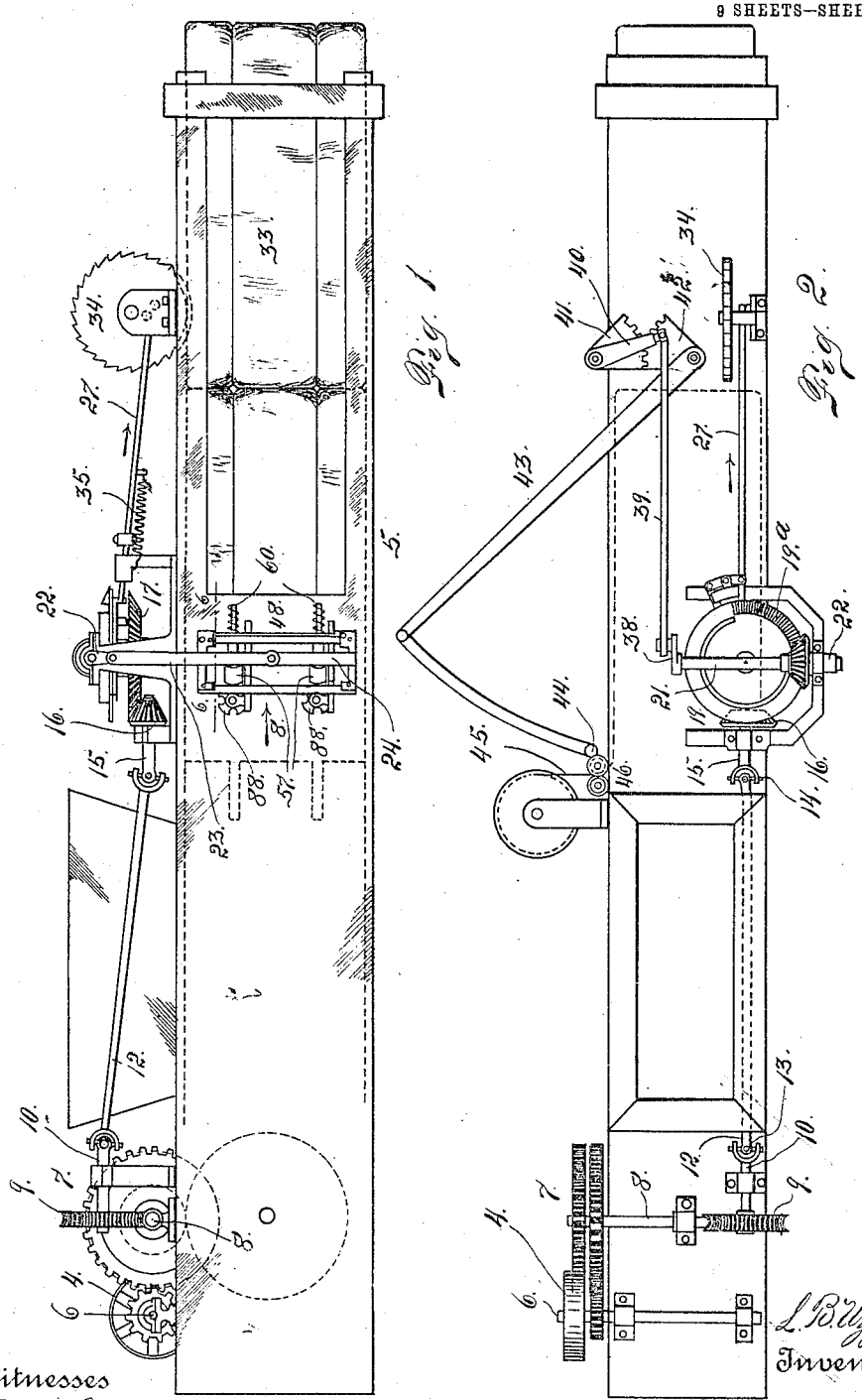
Witnesses
Otto E. Hoddick
Bert L. Rhoads
L. B. Wygant,
Inventor
By
Attorney No. 837,530. PATENTED DEC. 4, 1906.
L. B. WYGANT.
KNOTTER.
APPLICATION FILED MAY 19, 1905.

9 SHEETS—SHEET 2.

Witnesses
Inventor
L. B. Wygant.
By
Attorney

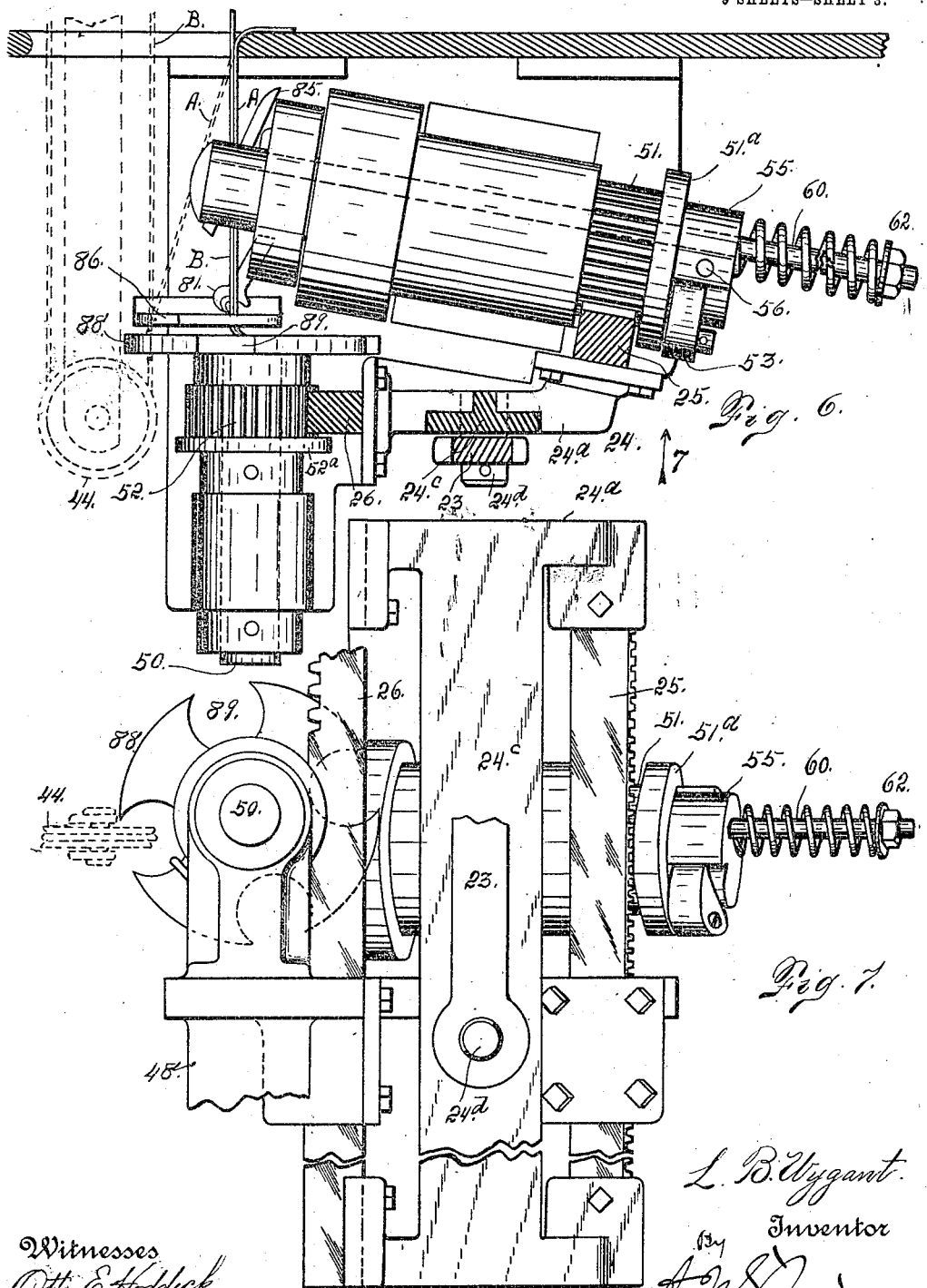

No. 837,530. PATENTED DEC. 4, 1906.
L. B. WYGANT.
KNOTTER.
APPLICATION FILED MAY 19, 1905.

9 SHEETS—SHEET 4.

Witnesses
L. B. Wygant
Inventor

Attorney

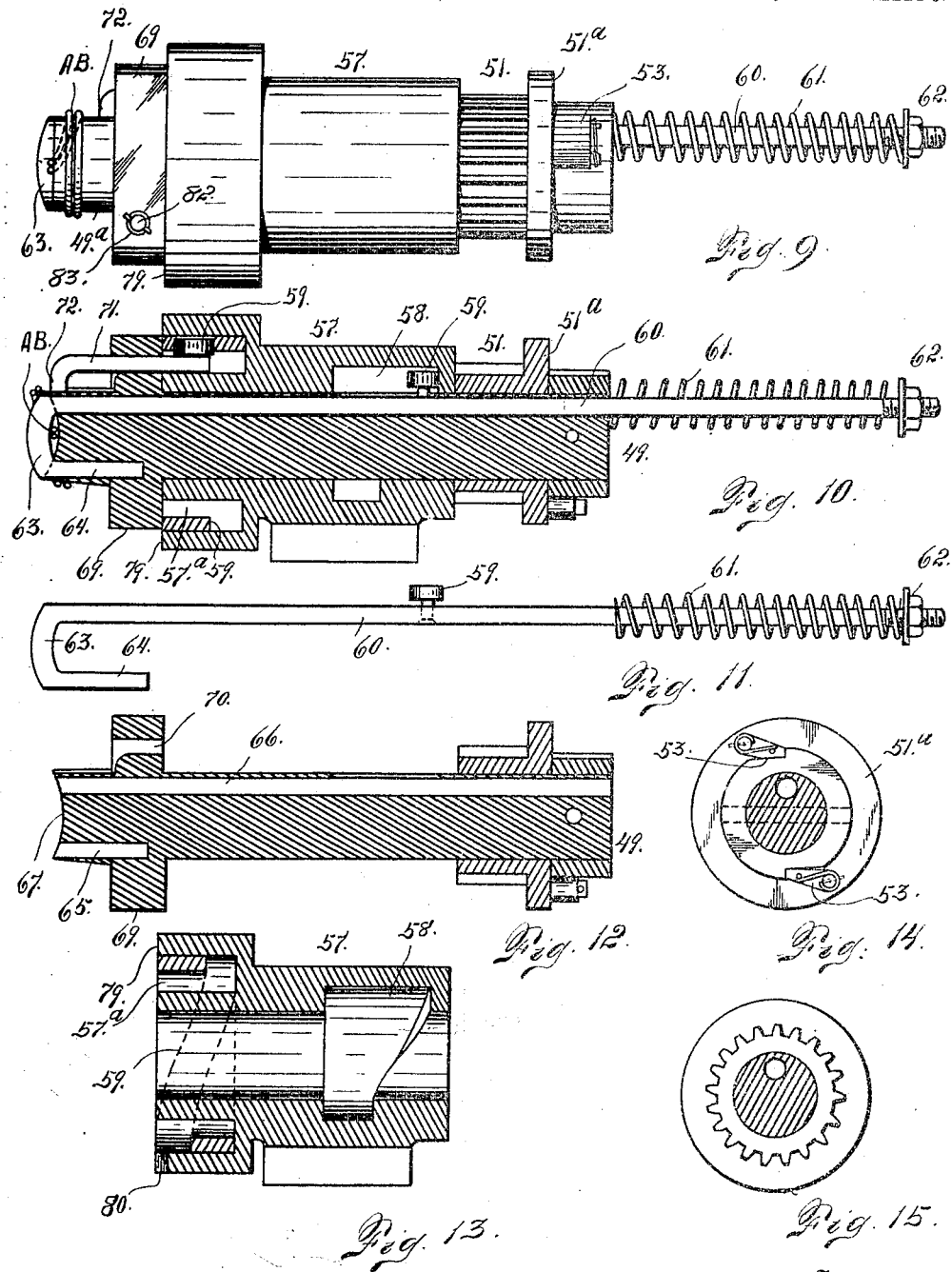

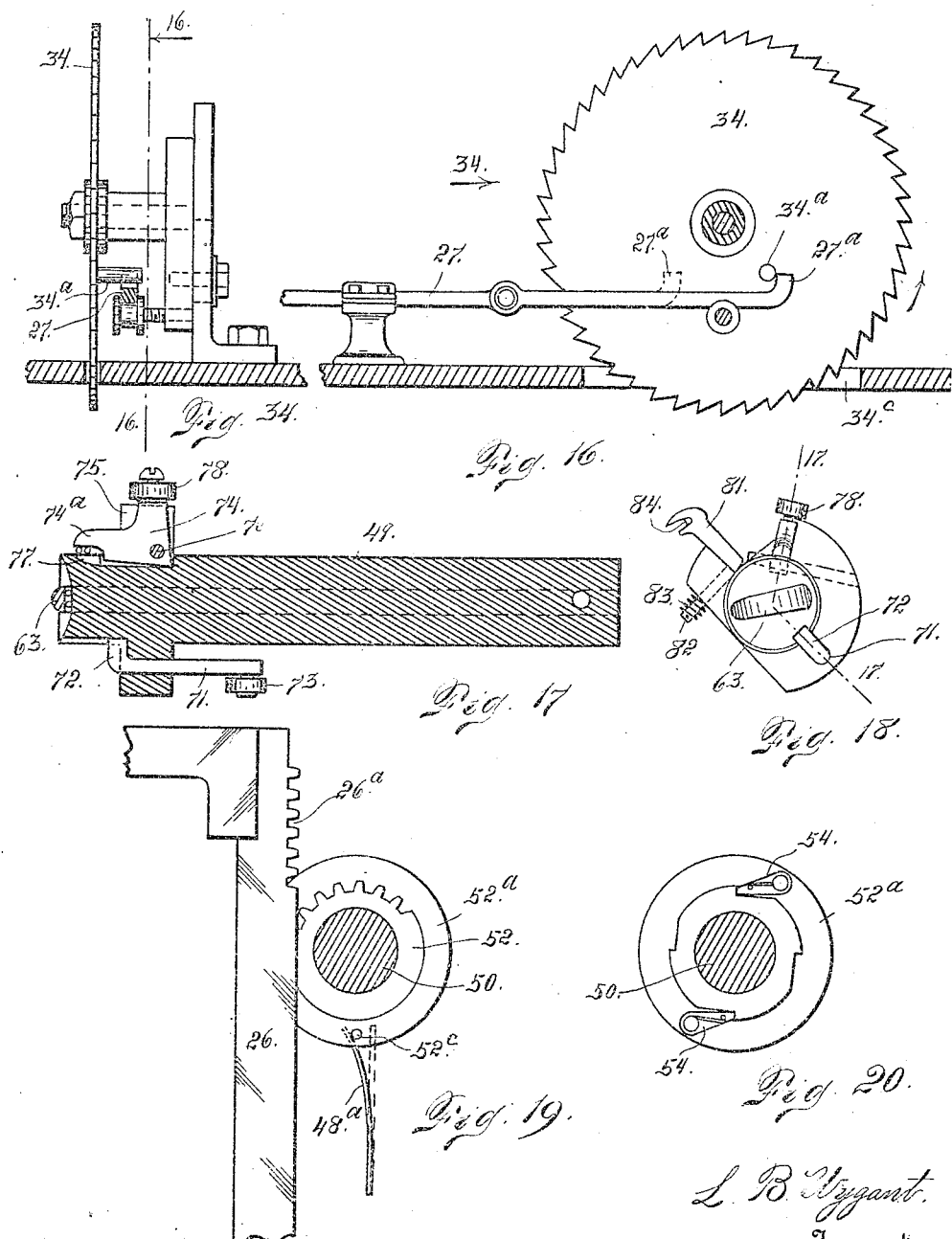

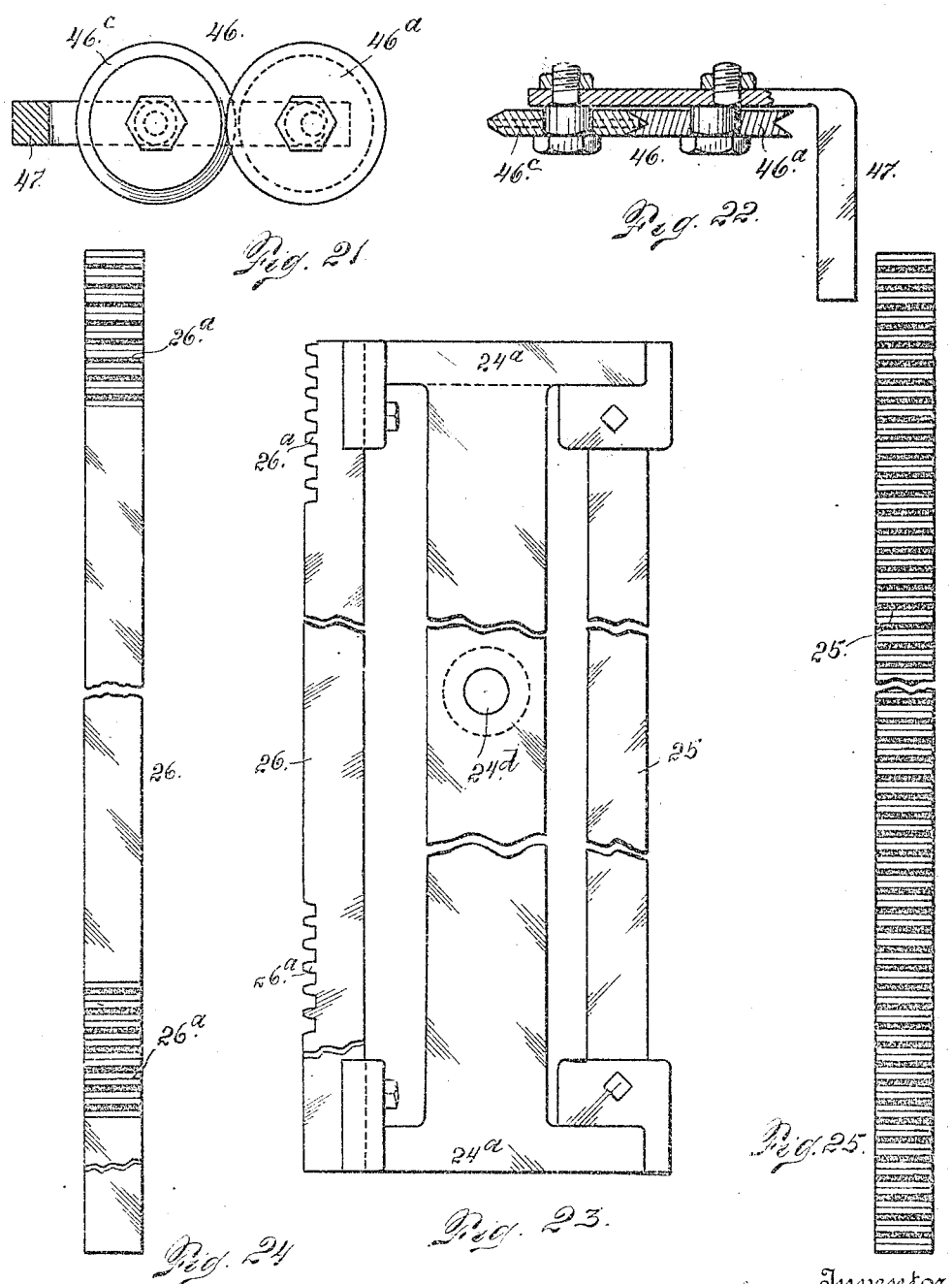

No. 837,530. PATENTED DEC. 4, 1906.
L. B. WYGANT.
KNOTTER.
APPLICATION FILED MAY 19, 1905.
9 SHEETS—SHEET 8.
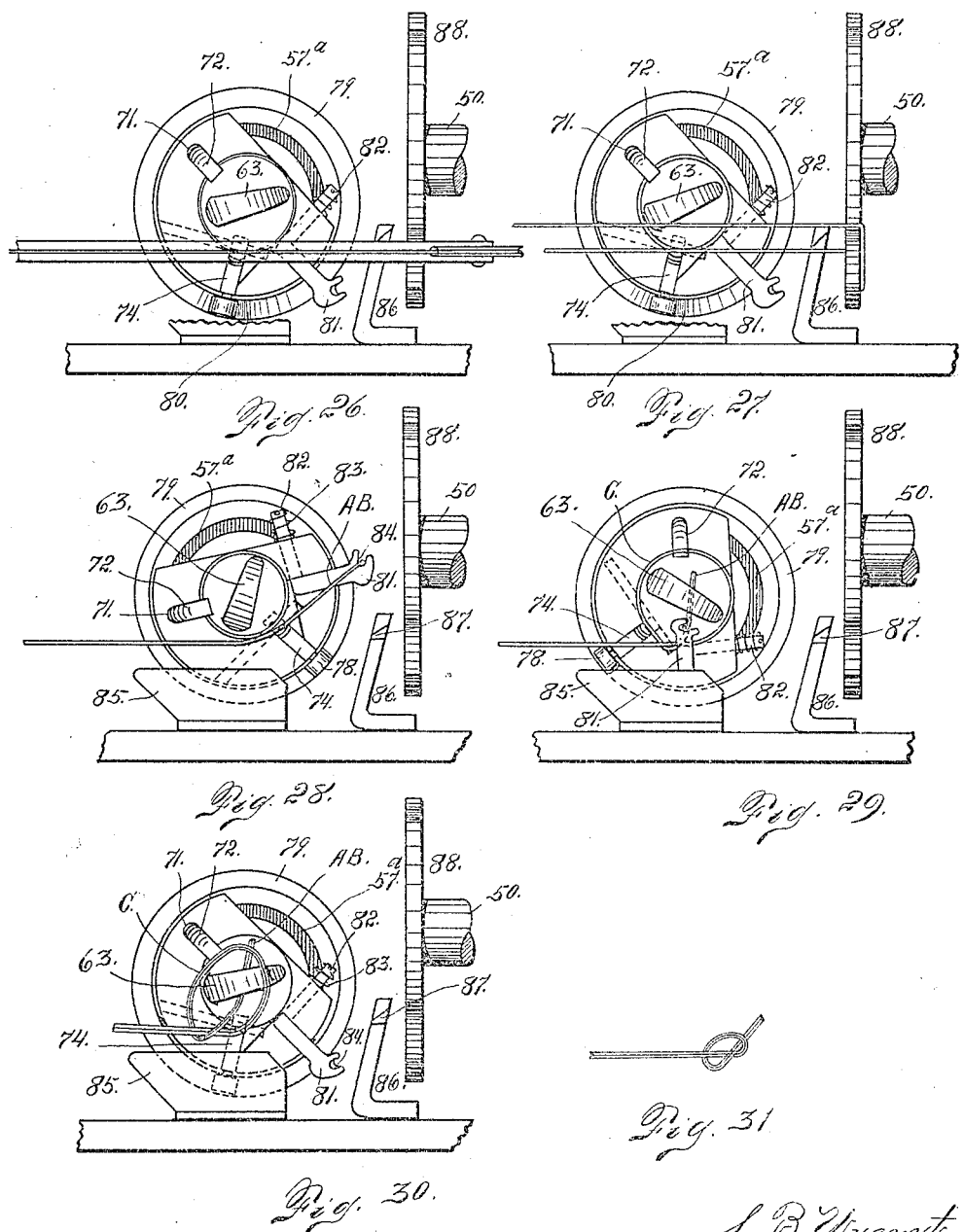

No. 837,530. PATENTED DEC. 4, 1906.
L. B. WYGANT.
KNOTTER.
APPLICATION FILED MAY 19, 1905.
9 SHEETS—SHEET 9.
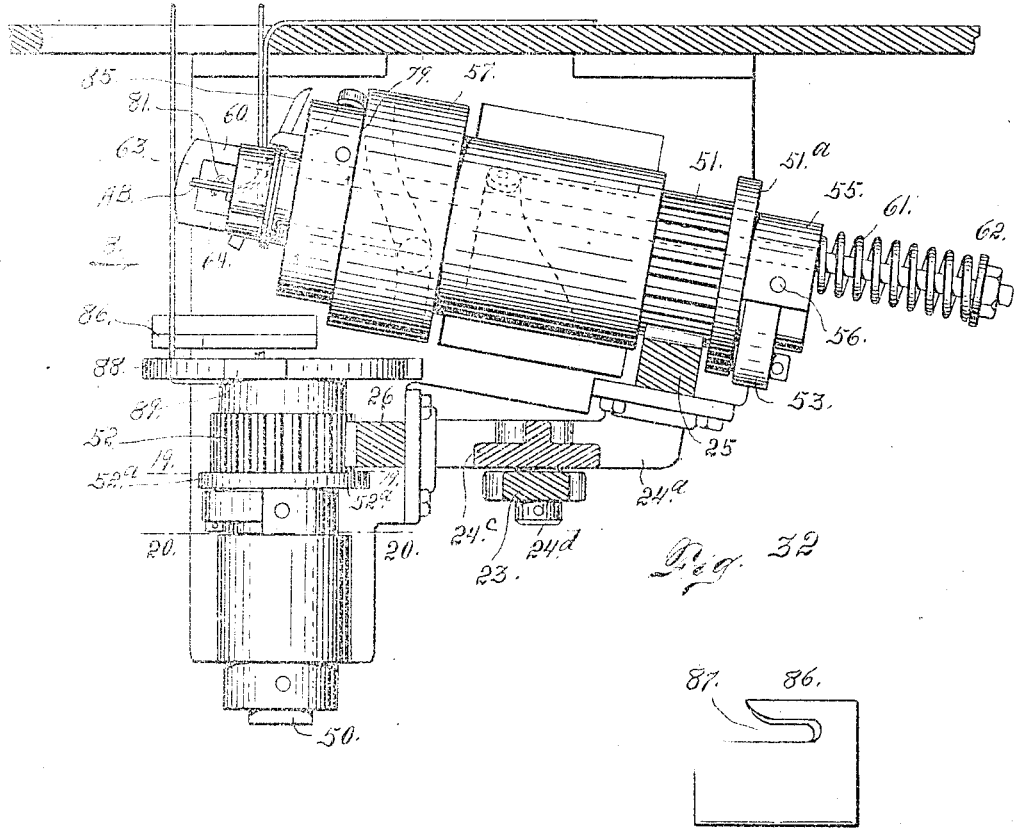
Fig. 32.
Fig. 33.
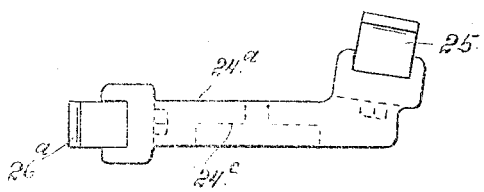
Fig. 35.
Witnesses:
L. B. Wygant
Inventor
By
Attorney

UNITED STATES PATENT OFFICE.

LEWIS B. WYGANT, OF DENVER, COLORADO, ASSIGNOR OF ONE-THIRD TO CLARENCE E. BOWER, OF DENVER, COLORADO.

KNOTTER.

No. 837,530.  Specification of Letters Patent.  Patented Dec. 4, 1906.

Application filed May 19, 1906. Serial No. 261,111.

*To all whom it may concern:*

Be it known that I, LEWIS B. WYGANT, a citizen of the United States, residing in the city and county of Denver and State of Colorado, have invented certain new and useful Improvements in Knotters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in knotters or mechanism for tying knots in baling-wires or the wires employed in retaining the bales of hay or other material forming in baling-presses, though it must be understood that my invention is adapted for use in all other relations where a similar function is required.

Having outlined the invention in a very general way, I will proceed to describe the same in detail, reference being made to the accompanying drawings, in which is illustrated an embodiment thereof.

Figure 3:
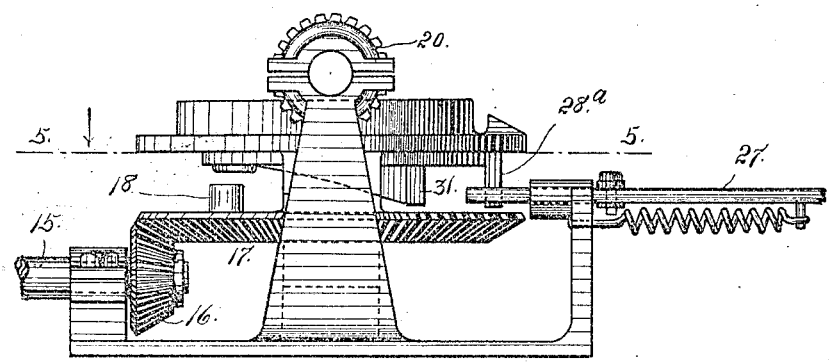
Figure 4:
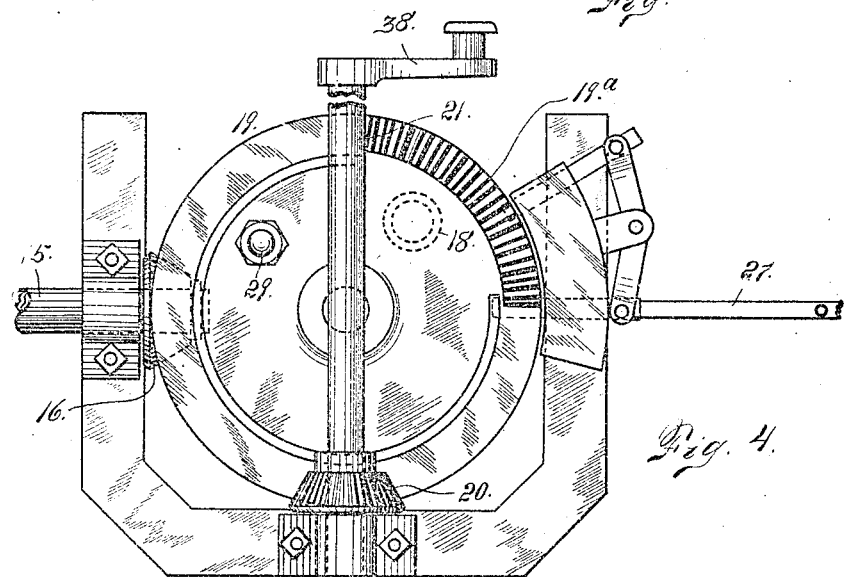
Figure 5:
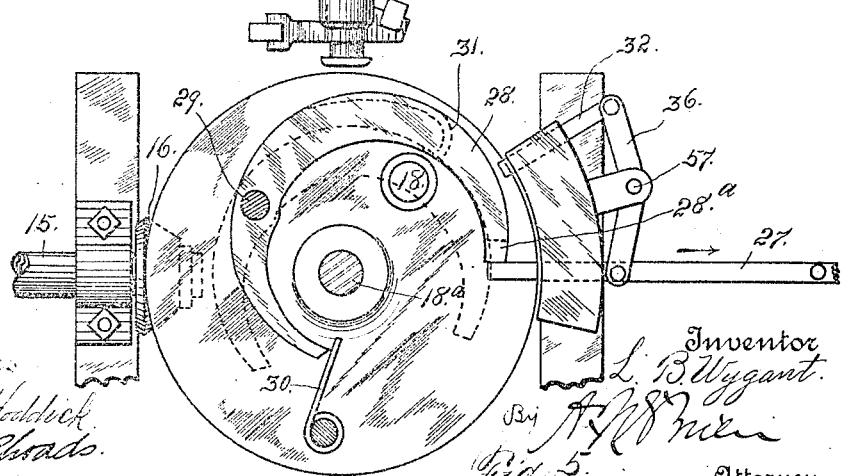
Figure 8:
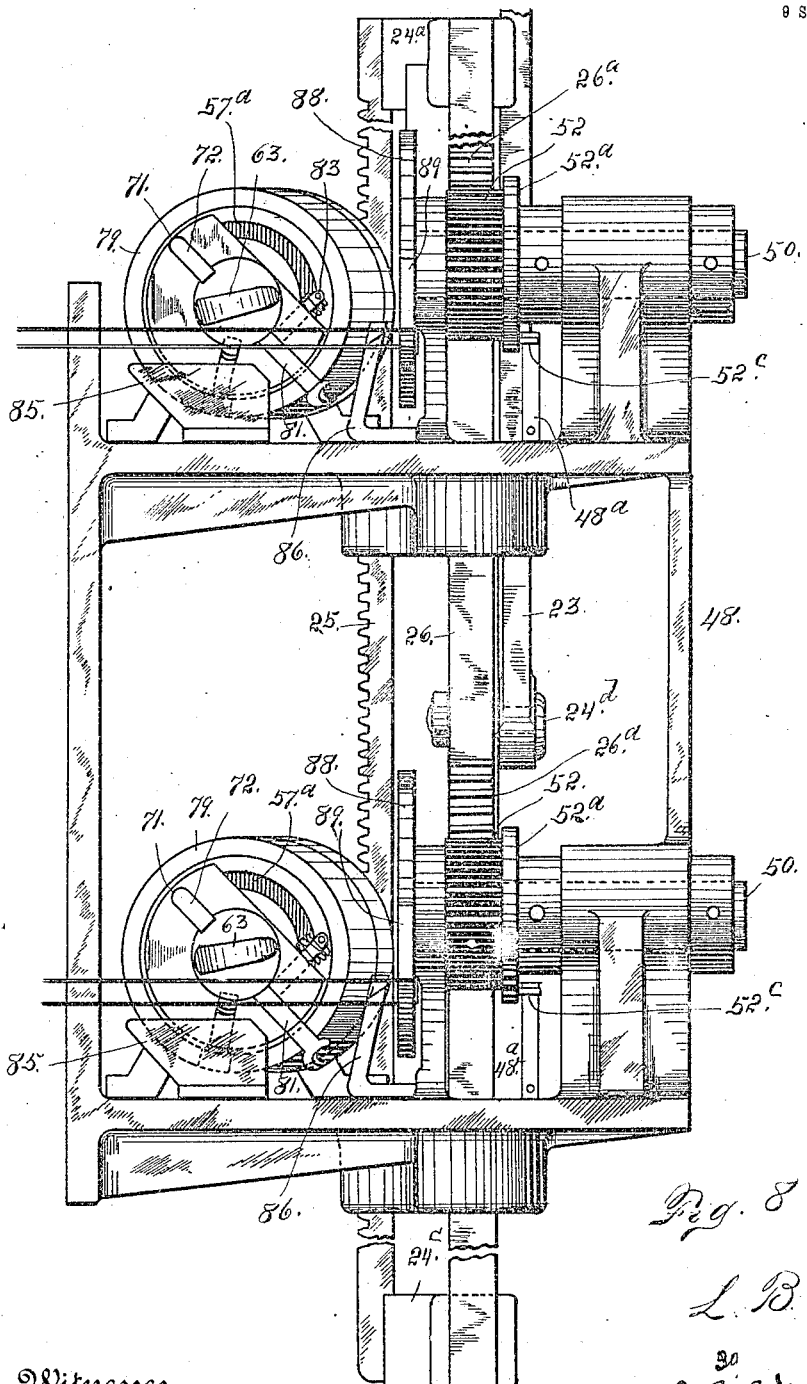

In the drawings, Figure 1 is a side elevation of a baling-press equipped with my knotter mechanism. Fig. 2 is a top plan view of the same. Fig. 3 is a side view of the transmission-gear or the gear for transmitting motion to the knotter mechanism. Fig. 4 is a top view of the same. Fig. 5 is a section taken on the line 5 5, Fig. 3, looking downwardly. Fig. 6 is a top view of the knotter mechanism, the vertically-movable rack for operating the same being shown in section, taken on the line 6 6, Fig. 1. Fig. 7 is an elevation of the same looking in the direction of arrow 7 in Fig. 6. In Figs. 3 to 7, both inclusive, the parts are shown on a larger scale than in Figs. 1 and 2. Fig. 8 is a detail view of two sets of knotter mechanism or the mechanism for tying two knots simultaneously, as is required in connection with hay-presses, two wires being used on each bale. This view is obtained by looking in the direction of arrow 8 in Fig. 1, the parts, however, being shown on a much larger scale than in the last-named figure. Fig. 9 is a detail elevation of the knotter proper, the parts being shown on a scale similar to Fig. 8. Fig. 10 is a longitudinal section of the construction shown in Fig. 9. Figs. 11, 12, and 13 illustrate, respectively and in detail, a number of elements of the knotter mechanism. Fig. 14 is a section taken through the knotter-shaft and illustrating the ratchet mechanism for rotating the shaft. Fig. 15 is a similar view illustrating the operating-gear mounted on the shaft. Fig. 16 is a detail view of the means for automatically controlling the movement of the transmission-gear by the action of the bales passing through the press. Fig. 17 is a sectional view of the knotter-shaft, taken on a different plane from Fig. 10. This view is a section taken on the line 17 17, Fig. 18. Fig. 18 is an end view of the knotter-shaft shown in Fig. 17. In Figs. 17 and 18 the cam-sleeve shown in Fig. 13 is removed from the shaft. Figs. 19 and 20 are sections taken on the lines 19 19 and 20 20, respectively, of Fig. 32. Figs. 21 and 22 are detail views illustrating the tension device through which the wire passes after leaving the spool. Fig. 23 is a detail view of the vertically-movable rack for operating the knotter mechanism, the same being partly broken away. Figs. 24 and 25 are detail views of the two rack-bars with which the construction shown in Fig. 23 is provided. Figs. 26 to 30, inclusive, are views of the knotter mechanism looking in the direction of the arrow in Fig. 32, showing the position of the parts during the different stages of the knot-tying operation. Fig. 31 shows the form of knot produced by the knotter. Fig. 32 is a view similar to Fig. 6, but with parts shown in different positions. Fig. 33 is a detail view of the knife for cutting the wires preparatory to forming the knot. Fig. 34 is a view of the construction shown in Fig. 16 looking in the direction of arrow 34 in the last-named figure. Fig. 35 is a top view in detail of the vertically-reciprocating rack-bar frame.

The same reference characters indicate the same parts in all the views.

Let the numeral 5 designate a baling-chamber; 6, the power-shaft for operating a train of gears 7, whereby motion is imparted to a counter-shaft 8, provided with a worm for operating a worm-wheel 9, fast on a shaft 10, whereby a shaft 12 is operated. This shaft 12, as shown in the drawings, is connected with the shaft 10 by a knuckle-joint 13. The shaft 12 is also connected by a knuckle-joint 14 with a short shaft 15, carrying a pinion 16, meshing with the gear 17, mounted on a shaft 18ª, the gear 17 being provided with a projection 18, mounted on its upper surface and adapted to interlock with a gear 19, which meshes with a pinion 20, mounted on a shaft 21, carrying a crank 22, which is connected by a rod 23 with a vertically-movable frame 24, mounted on one side of the baling-chamber and carrying two rack-bars, (designated 25 and 26, respectively.)

The mechanism designated by the reference characters 15 to 22, inclusive, may be termed the "transmission-gear" or the mechanism located between the power-shaft and the vertically-movable rack-bar frame, whereby motion is transmitted to the said frame at properly-timed intervals.

It will be understood that by connecting a belt with the pulley 4 on the power-shaft 6 a relatively slow movement will be imparted to the pinion 16, which, it may be assumed, is in continuous operation, whereby the larger gear 17 is continually rotated—that is to say, while the pulley 4 is connected with the power.

Normally a spring-actuated rod 27 engages a crescent-shaped lever 28, fulcrumed on the lower face of the gear 19, as shown at 29, and holds the said lever in such position that the rotation of the gear 17 will not operate the gear 19. When, however, the rod 27 is actuated or moved in the direction of the arrow in Fig. 1, the lever 28 is released, and a spring 30 acting thereon forces it to the dotted-line position in Fig. 5, whereby the pin 18 of the gear 17 engages a pocket 31, formed in the lever 28, the said pocket being brought into the circular path of the pin 18 by the movement of the lever 28 to the dotted-line position in Fig. 5. The movement of the rod 27 in the direction of the arrow (referring to Figs. 1 to 5, inclusive) also acts to throw an arm 32 inwardly toward the lever 28 and into position to engage the depending part 28ª of the lever, whereby the gear is locked against further movement until the wheel 34, acting on the rod 27, releases the latter, when a coil-spring 35, connected with the rod 27, returns the latter to its normal position and forces the arm 32 outwardly through the instrumentality of a lever 36, fulcrumed at 37. The rod 27 is thus brought into the path of the lever 28 when in its dotted-line position, whereby the said lever is returned to the full-line position, or with its pocket 31 out of the path of the projection 18 of the gear 17. The transmission-gear then ceases its movement and does not commence again until the ratchet 34 is again acted on by a bale within the baling-chamber.

It will be understood that the ratchet 34 passes through a slot in the top of the baling-chamber, whereby a number of the teeth of the ratchet lies in the path of the bale as the latter is moving through the baling-chamber.

The extremity of the shaft 21 remote from the crank 22 is provided with a crank 38, to which is attached one extremity of a rod 39, connected with a crank-arm 40 for operating a segmental gear 41, meshing with a similar gear 42 for reciprocating an angle-shaped lever 43, carrying at one extremity a roller 44, adapted to engage the baling-wire 45 after leaving the tension device 46, whereby the wire is threaded through the baling-chamber into the path of the bale as it is forced forwardly by the plunger. The tension device 46 is composed of two rollers 46ª and 46ᶜ, one being provided with a circumferential V-shaped groove, while the periphery of the other roller or wheel is beveled to engage the groove, sufficient room being left in the bottom of the groove for the wire. The rollers 46ª and 46ᶜ are journaled on an arm 47, secured to the baling-chamber.

The gear 19 is cogged, as shown at 19ª, only about one-fourth of the distance around it, but this cogged portion is sufficient, acting on the pinion 20, to impart a complete rotation to the shaft 21, whereby the angle-arm 43 is given a complete reciprocation or movement sufficient to thread the wire through the baling-chamber and then withdraw the arm again to the position shown in Fig. 2.

I have thus described somewhat briefly and in a preliminary way only the mechanism employed in connection with my improved knotter. Hence the knotter mechanism proper will now be described in detail. This mechanism is mounted on a frame 48, secured to the side of the baling-chamber, the same being located as best illustrated in Fig. 1. This framework carries two sets of knotter mechanism, whereby two knots are simultaneously formed, as heretofore explained. In describing the construction of the mechanism one set only of the knotter mechanism will be described, since the two sets are duplicates, and a description of one is a description of both. Each set of knotter mechanism is provided with a knotter-shaft 49 and a shaft 50, the axes of the two shafts, as shown in the drawings, occupying positions forming an acute angle preferably slightly less in degree than a right angle, as best indicated in Figs. 6 and 32. The shaft 49 is provided with a gear 51, acted on by the rack-bar 25 of the vertically-movable frame 24, while the shaft 50 is provided with a gear 52, acted on by the rack-bar 26 of the vertically-movable rack-bar frame. These two rack-bars are connected by two arms 24ª, connected by a web 24ᶜ, having a wrist-pin 24ᵈ, to which the connecting-rod 23 is attached. (See Fig. 6.) It will be observed that the rack-bar 26 is only cogged for a short distance at its upper and lower extremities, as shown at 26ª. (See Figs. 23 and 24.) Each of these cogged portions is adapted to engage a gear 52 of one set of knotter mechanism and impart a quarter of a revolution or approximately a quarter of a revolution to the shaft 50 for each rotation of the shaft 21 of the transmission-gear, while the rack-bar 25, being cogged its entire length, is adapted to impart a greater relative degree of motion to the knotter-shaft 49. It is estimated that for every quarter-rotation of the shaft 50 the shaft 49 should travel one and one-fourth revolutions.

Both gears 51 and 52 are loose on their respective shafts, and these gears are provided with collars 51$^a$ and 52$^a$, respectively, upon which are mounted spring-actuated pawls 53 and 54, respectively. The dogs 53 engage teeth formed on a ratchet-collar 55, whereby the shaft 49 is rotated during one stroke of the ratchet-bar 25, while during the other stroke of the bar the gear 51 rotates idly on the shaft and the pawls 53 slip over the teeth of the ratchet-collar. Attention is called to the fact that the collar 55 is secured to the shaft 49 by a pin 56.

The shaft 49 passes through a sleeve 57, provided with cam-grooves 58 and 59. This sleeve is made fast to the framework 48. The cam-groove 58 is engaged by a roller 59, carried by a rod 60, which passes through the knotter-shaft and protrudes from both extremities thereof. At one extremity this rod is provided with a coil-spring 61, which surrounds the rod, one extremity of the spring engaging the shaft at one end, while the other extremity of the spring engages a stop 62, formed on the rod. The opposite extremity of the rod 60 is hook-shaped, forming a sort of loop 63 and having a part 64 occupying a position parallel with the body of the rod and engaging an opening 65 in the head extremity of the rod lying parallel with the opening 66, through which the rod 60 passes. The head extremity of the shaft 49 is slightly hollowed out, as shown at 67, while the loop end 63 of the rod is slightly curved on its inner surface, thus leaving a narrow space occupied by the two wire ends A B when the loop 63 is at its inward limit of movement, the loop gripping the wires and holding them securely in place for a purpose hereinafter explained. Surrounding the shaft 49 immediately in the rear of the head extremity 49$^a$ of said shaft is a collar 69, provided with an opening 70, through which passes an arm 71, having a forward extremity 72 bent substantially at right angles to the body of the arm. The inner extremity of this bent end 72 occupies a position close to the head 49$^a$ of the knotter-shaft, and its normal position may be said to be at the rear extremity of the head of this shaft or in the position shown in Fig. 17. The rear end of the arm 71 is provided with an antifrictional roller 73, which engages the cam-groove 59 of the sleeve 57. This sleeve is also provided with a circular auxiliary groove 57$^a$, in which the arm 71 travels. As the shaft 49 rotates the roller extremity of the arm 71, assuming that the latter is in the position shown in Fig. 17, travels through the cam-groove 59 from the rear extremity to the forward extremity of the said groove, thus moving the bent end of the arm outwardly to the forward extremity of the head 49$^a$, whereby the wire convolution carried by the head of the knotter-shaft is pushed from the said end. This act occurs while the extremities A B of the wires are held by the looped end of the rod 60. This is practically the completion of the knotting act.

The rod is moved forwardly against its spring 61 by the travel of its roller 59 in the cam-groove 58 from the rear extremity to the forward extremity of the said groove, after which the roller 59, being released, returns suddenly to the rear extremity of the groove under the action of the spring 61. While the looped end of the rod is at its forward limit of movement, the ends of the wires A B are passed through the space between the loop and the head extremity of the knotter-shaft, so that when the rod is released the wire ends A B are gripped between the loop of the rod and the extremity of the shaft, as shown in Fig. 10.

During the forming of the wire convolution around the head of the knotter-shaft a gripping-lever 74 is employed. This lever is located within a recess 75, formed in the collar 69 of the knotter-shaft, and is fulcrumed, as shown at 76. This device has the general form and action of a bell-crank lever. Its arm 74$^a$ may be called the "gripping-arm," since it engages the wires and carries them around with the shaft as the latter is rotated. The extremity of the shaft where the lever 74 grips the wire is provided with a slight recess 77, so shaped that the lever-like device is enabled to securely hold the wires in place during the performance of the said function. The arm of the lever remote from the gripping-arm is provided with an antifrictional roller 78, which engages a path or shoulder 79 of the sleeve 57 in such a manner that the wires are gripped by the lever, except when the roller engages a recess 80, formed in said shoulder, whereby the lever ceases to grip the wires. This occurs approximately at the same time that the wire ends are gripped by the looped end 63 of the rod 60. The knotter-shaft is also provided with a device 81, which is made fast to a spindle 82, journaled in the collar 69. This spindle is surrounded by a coil-spring 83, which has a torsional action on the spindle, whereby there is a tendency to return the device 81 to its normal position, which, it may be assumed, is that shown in Figs. 26, 27, 28, and 30. The outer extremity of the device 81, which may be termed a "carrier" or "carrier-arm," is provided with a recess 84, adapted to receive the loose ends of the wires to be knotted or the ends of the wires just in advance of the point where the gripping-lever 74 acts thereon. This carrier device travels around with the knotter-shaft, and just at the time that the looped end of the rod 60 is thrust forwardly this carrier-arm engages a cam-plate 85, which forces the arm upwardly or toward the center of the shaft, as shown in Fig. 29, whereby the wire ends, which have heretofore been designated as A B, are passed through the looped end of the rod. As soon as this occurs the rod 60 is released and grips the wires. Then as the shaft continues its movement the carrier-arm passes beyond the plate 85, when the torsional action of the spring 83 forces the carrier-arm to its normal position, whereby it leaves the wire ends and is ready to repeat its wire carrying and manipulating function.

Adjacent the head extremity of the knotter-shaft is located a cutter 86, provided with a slot 87, into which the wires are drawn, and by the action of a disk 88, mounted on the shaft 50 and provided with recesses 89, through which a portion of the roller 44, which carries the wire transversely through the baling-chamber, as heretofore explained, passes just as it reaches its limit of forward movement. As soon as the wire is threaded through a recess 89 of the disk 88 the wires A and B are brought together. The disk is then given a partial rotation, which moves the said wires into the slot 87 of the cutter-plate. At the same time the two wires are taken by the carrier-arm and moved sufficiently to be severed by the cutter-plate.

In describing the operation of the mechanism attention is called to the fact that the rod 27, whose movement in the direction of the arrow (indicated in Fig. 1) permits the transmission-gear to act on the knotter mechanism, is provided at its rear extremity, or that farther to the right in Figs. 1, 2, and 16, with a bent extremity 27ª, which is engaged by a pin 34ª of the toothed disk 34 and moved from the dotted-line position shown in Fig. 16 to the full-line position in said figure, when the movement of the disk in the direction indicated by the arrow in Fig. 16 causes the pin 34ª to release the rod, whereby the latter is returned to the position indicated by dotted lines. It will be understood that the ratchet-disk 34 passes through a slot 34ᶜ, formed in the top of the baling-chamber, whereby the bale 33 engages the teeth of the disk as the bale is passing through the baling-chamber and actuates the latter sufficiently for the purpose stated. It is assumed that each bale that passes through the chamber will impart a complete rotation to the ratchet-disk. At the same time it will be understood that only a small part of this rotation is utilized in actuating the rod 27, since as soon as the rod is released and returned to the dotted-line position in Fig. 16 the pin 34ª does not again engage the rod until the pin has moved around to the dotted-line position of the hooked end of the rod or until it has made one complete revolution after its previous engagement with the hooked end of the rod.

Now in beginning the description of the knot-tying operation it may be assumed that, in the first instance, one end of the wire 45 has been passed by hand through the baling-chamber and connected with the retaining-wheel 88 in such a manner that the wire extremity connected with this wheel will remain in place while the bale forces the wire to the position shown by dotted lines in Fig. 2. After this is done the operation of the mechanism is entirely automatic. In other words, suitable power being connected with the pulley 4 the transmission-gear is set in motion and operated in such a manner as to impart the necessary movement to the knotter mechanism at proper times to perform the knotter function. In other words, as the shaft 21 is rotated the arm 43 is actuated, whereby the wire 45 is engaged just at the right of the tension device, referring to Fig. 2, and the wire carried through the baling-chamber at the left-hand extremity of the bale. In this case the roller 44, together with the wire 45, may be said to be in the position shown by dotted lines in Figs. 6 and 7. Now the wire part originally connected with the wheel 88 may be said to be in the position shown by dotted lines in Fig. 6, and this part will be designated A, while the part which is to be joined with A for knot-tying purposes will be designated B. When the wire parts A and B are in the position shown by dotted lines in Fig. 6, a partial rotary movement is imparted to the disk 88 in a manner heretofore explained. It may be assumed at the beginning of the operation that the two wire parts A and B are both within a recess 89 of the wheel 88. Now as a partial rotary movement is imparted to the wheel 88 the two wire ends are carried to the position shown by full lines in Fig. 6, the two wire parts A and B being now in contact. Simultaneously with this movement of the disk 88 the rotary movement is imparted to the knotter-shaft, whereby the gripping-lever 74 is made to grip the wire parts A and B. At the same time these two wire parts in advance of the gripping-lever are engaged by the carrier-arm 81 and actuated to cause the cutter 86 to sever the wire parts. The steps already described may be said to be illustrated by Figs. 26, 27, and 28 of the drawings, the last step being illustrated in Fig. 28. Now as the knotter-shaft continues its rotary movement the wire ends A B are carried around therewith by the arm 81, and just before this arm reaches the position shown in Fig. 29 it engages the plate 85, which forces the hooked extremity of the arm toward the center of the knotter-shaft, whereby the ends A B of the wire are passed through the looped extremity 63 of the rod 60, the said rod having been forced outwardly by the action of the cam-groove of the sleeve 57 on its roller 59, as heretofore explained. Now after the passing of the wire ends A B through the loop of the rod the roller 59 of the rod is released by the cam and the spring 61 returns it quickly to its normal position, gripping the wire ends A B, as shown in Figs. 10 and 30. The arm 81 then releases the wires, which are also released by the gripping device 74, whose roller 78 enters the recess 80. Simultaneously with the act just described the bent extremity 72 of the push-rod 71 moves forwardly and pushes the convolution C of the wires A B over the head extremity of the knotter-shaft, thus forming the knot, as shown in Figs. 30 and 31. Simultaneously with this action the bale thus tied is moved rearwardly or toward the right, referring to Figs. 1 and 2, and the knotted end of the wire carried with the bale, the looped end of the rod 60 moving forwardly in time to release the ends of the knot, but not, however, until the action of the bale has been sufficient to tighten the knot. Then as the next charge of hay has moved rearwardly in the baling-chamber the operation just described is repeated. It will be understood that two knots are simultaneously formed in the two wire ends with which the bale is held.

Attention is called to the fact that the frame 48 is provided with two leaf-springs 48ª, which engage pins 52ᶜ, formed on the collars 52ª of the gears 52, whereby the said gears are normally acted on to throw them into mesh with the teeth 26ª of the rack-bar 26. This is illustrated in Figs. 8 and 19.

Having thus described my invention, what I claim is—

1. In a knotter, the combination of means for bringing together the two wires or other devices to be tied, means including a rotary pivoted gripping device, for forming a loop with the wires, the rotary gripping device having a gripping movement acting independently of its rotary movement, and means for passing the loop over the two wire ends.

2. In a knotter, the combination of means for bringing the wires or other devices together in parallel or approximately parallel relation, means for retaining and cutting the same, means including a rotary pivoted gripping device for forming a loop with the wires, the gripping device having a gripping movement acting independently of its rotary movement, and means for passing the loop over the two wire ends.

3. In a knotter, the combination of means for bringing together in parallel relation the devices to be tied, means including a rotary pivoted gripping device for forming a knot in the two devices without changing their relation to each other, the gripping device having a gripping movement acting independently of its rotary movement.

4. In a knotter, the combination of means for bringing together the wires or other devices to be tied, means for retaining the wire, means for cutting the wire, and means including a rotary pivoted gripping device for forming a knot in the devices, the rotary gripping device having a gripping movement acting independently of its rotary movement.

5. In a knotter, the combination of means for bringing the two devices to be tied, together in substantially parallel relation, means for retaining the devices, means for cutting them, means including a rotary gripping device for forming a loop in the devices adjacent to their free ends, the rotary gripping device having a gripping movement acting independently of its rotary movement, and means for passing the loop over the free ends of the device to be tied.

6. In a knotter, the combination of means for bringing the two devices to be tied, together in substantially parallel relation, means for retaining the devices, means for cutting them, a pivoted rotating gripping device, having a gripping action independently of its rotary movement, and means for passing the loop over the free ends of the devices to be tied.

7. In a knotter, the combination of means for bringing together and retaining the devices to be tied, means for severing the two devices, means for pivoted gripping the devices at a suitable distance from their free ends, means for rotating the gripping means to form a loop, the gripping means having a gripping movement acting independently of its rotary movement, and means for passing the loop over the free ends of the devices.

8. The combination of a knotter-shaft mounted to rotate, and means including a rotary pivoted gripping device mounted on the shaft for carrying the devices to be tied around the shaft during the latter's rotation, whereby a loop is formed, the rotary gripping device having a gripping movement independently of its rotary movement, and means for passing the loop over the ends of the devices to form a knot.

9. In a knotter, the combination of a rotating shaft, means mounted on the shaft for gripping the devices to be tied whereby they are carried around the shaft together forming a loop when the shaft is rotated, means also mounted on the shaft and adapted to carry their free ends during the forming of the loop, and means for passing the loop over the said ends.

10. In a knotter, the combination of a rotary shaft, means for bringing together the devices to be tied, means pivotally mounted on the shaft for gripping the devices whereby they are carried around with the shaft to form a loop, the gripping means having a gripping movement independently of its rotary movement, and means for passing the loop over the free ends of the devices.

11. In a knotter, the combination of a rotating device, means for bringing together the devices to be tied, means pivotally mounted on the shaft for gripping the devices whereby they are carried around with the shaft to form a loop, the gripping means having a gripping movement independently of its rotary movement, means for carrying the free ends of the devices toward the axis of the loop but in front of the latter, and means for pushing the loop forwardly over the free ends to form a knot.

12. The combination of a rotary shaft, a gripper mounted on the shaft for causing the devices to be tied, to move with the shaft to form a loop as the shaft rotates, means located in advance of the gripper for carrying the free ends of the devices during the formation of the loop and then carrying the said ends across the loop and in front of the latter, means mounted on the shaft for holding the said ends, and means also mounted on the shaft for pushing the loop off the shaft and to a position forward of the free ends whereby the knot is formed.

13. In a knotter, the combination of a shaft mounted to rotate, a retaining device located adjacent the shaft, a cutter located between the retaining device and the shaft, means for bringing together the devices to be tied, into position to be acted on by the retaining device, means carried by the shaft to cause the cutter to sever the devices, and a gripping device pivotally mounted on the shaft and acting independently of the shaft's rotary movement.

14. In a knotter, the combination of a shaft mounted to rotate, a retaining device mounted on the shaft, and a second shaft extending at an angle to the first-named shaft and provided with means for tying the knot.

15. In a knotter, the combination of a retaining-shaft mounted to rotate and carrying a disk having recesses open at its periphery, a knotter-shaft whose axis forms an angle with the axis of the retaining-shaft, and means mounted on the knotter-shaft for taking the devices to be tied from the retaining-shaft and forming the knot.

16. The combination of two rotating shafts whose axes when one is produced to intersect the other form an interior angle somewhat less than a right angle, a retaining device mounted on one shaft, knotting devices mounted on the other shaft, and a cutter interposed between the two shafts.

17. The combination of two coöperating shafts, one carrying a retaining device and the other mechanism for forming the knot in the wires or other devices to be tied, the two shafts being located in suitable proximity, their axes forming an angle when one is produced to intersect the other, gears mounted on the retaining-shafts, and a movable frame provided with rack-bars for engaging the gears to actuate the same.

18. The combination of two coöperating shafts, one carrying a retaining device and the other mechanism for forming the knot in the wires or other devices to be tied, the two shafts being located in suitable proximity and forming an angle, gears mounted on the respective shafts, a frame mounted to reciprocate and provided with rack-bars engaging the gears of the respective shafts, the bars being cogged to impart motion to the two shafts in unequal degrees.

19. The combination of two coöperating shafts standing at an angle to each other, one carrying a retaining device and the other mechanism for forming the knot in the wires or other devices to be tied, the two shafts being located in suitable proximity, gears mounted on the respective shafts, a frame mounted to reciprocate and provided with rack-bars engaging the gears, the bars being cogged to impart motion to the two shafts in unequal degrees, the shaft carrying a knotter mechanism having the greater relative movement.

20. The combination of a plurality of sets of knotter mechanism, each set being provided with two shafts standing at an angle to each other, one shaft carrying the knotter mechanism and the other a retaining device, the two shafts of each set being provided with gears, and a movable frame engaging the gears of both sets of mechanism whereby they are simultaneously actuated.

21. In a knotter, the combination of two shafts standing at an angle to each other, a retaining device mounted on one shaft, knotter mechanism mounted on the other shaft, gears loose on the respective shafts, a ratchet-and-pawl connection between the gears and the shaft, whereby the movement of the gears in one direction actuates the shafts, and a reciprocating device carrying rack-bars for actuating the gears.

22. The combination with a baling-press, of two rotary shafts mounted on the press, a retaining device mounted on one shaft, knotting devices mounted on the other shaft, gears mounted on the respective shafts, a reciprocating frame, rack-bars mounted on the frame and engaging both gears in operative relation, and means controlled by the passage of the bales through the press for intermittently actuating the rack-bar frame.

23. The combination with a baling-press, of two rotary shafts mounted on the press, and standing at an angle to each other, a retaining device mounted on one shaft, knotting devices mounted on the other shaft, gears mounted on the respective shafts, a reciprocating frame, rack-bars mounted on the frame and engaging the respective gears in operative relation, propelling mechanism, a transmission-gear interposed between the propelling mechanism and the rack-bar frame, and connected with the latter in operative relation, the transmission-gear being controlled by the passage of the bale through the press.

24. The combination with a baling-press, of two shafts mounted thereon and standing at an angle to each other, knotter mechanism mounted on one shaft, a retaining device mounted on the other shaft, gears for rotating the shafts, a frame mounted to reciprocate and provided with rack-bars engaging the gears, a transmission-gear controlled by the passage of bales through the press and provided with a crank-shaft, and a rod connecting the crank-shaft with the rack-bar frame for reciprocating the latter.

25. In a knotter, the combination of a rotating shaft, knotting devices mounted on the shaft, a stationary sleeve through which the shaft passes, and cams formed on the sleeve for controlling certain of the knot-forming devices of the shaft.

26. In a knotter, the combination of a rotary shaft, a gripper mounted thereon for holding the devices to be tied whereby they are passed around the shaft to form a loop, a spring-retained rod mounted on the shaft and having a loop at one extremity, an arm mounted on the shaft for passing the free ends of the devices to be tied through the loop of the rod, and a rod also mounted on the shaft for pushing the loop of the knot off the end of the shaft and over the loop of the rod, a sleeve through which the shaft passes, the sleeve being provided with cams for actuating the gripper, the looped rod and the push-rod respectively.

27. In a knotter, the combination of a rotary shaft, a stationary sleeve through which the shaft passes, a gripper, a looped rod and a push-rod all mounted on the shaft and controlled by the sleeve as the shaft rotates, substantially as described and for the purpose set forth.

28. In a knotter, the combination of a shaft, a stationary sleeve in which the shaft is revolubly mounted, a spring-retained rod passing through the shaft and having a looped extremity protruding from one end of the shaft, a projection mounted on the rod, a cam-groove formed in the sleeve which said projection engages whereby the rod is actuated as the shaft rotates, and a push-rod also mounted on the shaft and having a hook-shaped extremity protruding therefrom, the last-named rod also having a projection engaging a cam-groove formed in the sleeve.

29. In a knotter, the combination of a shaft, a sleeve in which the shaft is journaled, a gripping device, a looped rod and a push-rod mounted on the shaft and actuated from the sleeve as the shaft rotates, a carrier-arm pivotally mounted on the shaft, and a stationary cam-plate for actuating the said arm as the latter is carried around with its shaft.

30. In a knotter, the combination of a shaft, a stationary sleeve in which the shaft is mounted to rotate, a looped rod passing through the sleeve and spring-actuated in one direction, a cam on the sleeve for moving the said rod against its spring and retaining the same, a push-rod mounted on the shaft, a cam on the shaft for moving the push-rod in both directions, a gripping device mounted on the shaft and acted on by the sleeve, a carrier-arm pivotally mounted on the shaft, and a stationary cam-plate for actuating the arm as the latter is carried around with the shaft.

31. In a knotter, the combination of two shafts standing at an angle to each other and mounted to rotate, a retaining device mounted on one shaft, knotting mechanism mounted on the other shaft and comprising a gripper, a carrier-arm, a looped rod, and a push-rod, the parts being assembled and arranged to perform the several steps of the knotting function, substantially as described.

32. In a knotter, the combination of a retaining-shaft, and a knotter-shaft occupying positions at an angle to each other, a retaining device mounted on the retaining-shaft, a gripping device, a spring-retained reciprocating looped rod, and a reciprocating push-rod all mounted on the knotter-shaft, a sleeve through which the knotter-shaft passes and which is engaged by the said lever and said rods, whereby the said devices are aided in the performance of their several functions in the knotting operation.

33. The combination of a retaining-shaft, a knotter-shaft, the two shafts standing at an angle to each other, a retaining device mounted on the retaining-shaft, a gripping device, a looped rod, a push-rod, a carrier-arm mounted on the knotter-shaft, a sleeve through which the knotter-shaft passes, a spring for actuating the looped rod in one direction, the sleeve having a cam-groove, and the looped rod a projection extending into the groove whereby the looped rod is moved in the opposite direction, a second cam-groove also formed in the sleeve, a push-rod having a projection engaging the last-named cam-groove for reciprocating the rod, the gripping device having a part engaging the sleeve whereby the said device is controlled, and a stationary cam-plate which the carrier-arm engages.

34. In a knotter, the combination of means for bringing together the two wires or other devices to be tied, means for forming a loop in the wires, and means including a pivoted arm for passing the loop over the two wire ends.

35. In a knotter, the combination of means for bringing together the two wires or other devices to be tied, and means for forming a loop in the wires, said means including a spring-retained pivotally-mounted carrier-arm.

36. In a knotter, the combination of means for bringing together the two wires or other devices to be tied, means for forming a loop in the wires, and means including a spring-retained cam-actuated carrier-arm for passing the loop over the two wire ends.

In testimony whereof I affix my signature in presence of two witnesses.

LEWIS B. WYGANT.

Witnesses:
 DENA NELSON,
 A. J. O'BRIEN.